United States Patent [19]

Baldwin

[11] Patent Number: 4,563,710
[45] Date of Patent: Jan. 7, 1986

[54] DIGITAL TELEVISION TAPE RECORDING

[75] Inventor: John L. E. Baldwin, Eastleigh, United Kingdom

[73] Assignee: Independent Broadcasting Authority, London, United Kingdom

[21] Appl. No.: 617,850

[22] PCT Filed: Feb. 5, 1982

[86] PCT No.: PCT/GB82/00030

§ 371 Date: Oct. 5, 1982

§ 102(e) Date: Oct. 5, 1982

[87] PCT Pub. No.: WO82/02810

PCT Pub. Date: Aug. 19, 1982

Related U.S. Application Data

[63] Continuation of Ser. No. 438,878, filed as PCT GB82/00030 Feb. 5, 1982, published as WO 82/02810, Aug. 19, 1982, § 102(e) date Oct. 5, 1982.

[30] Foreign Application Priority Data

Feb. 5, 1981 [GB] United Kingdom ................. 8103502

[51] Int. Cl.⁴ ......................... H04N 5/008; H04N 5/76
[52] U.S. Cl. ..................................... 360/9.1; 358/339; 358/341; 360/39; 360/19.1
[58] Field of Search ....................... 360/9.1, 10.3, 19.1, 360/33.1, 36.1, 36.2, 39; 358/335, 337, 339, 341

[56] References Cited

U.S. PATENT DOCUMENTS 4,283,744 8/1981 Melwisch et al. ............. 360/36.1 X
4,353,098 10/1982 Heinz et al. ........................ 360/9.1

FOREIGN PATENT DOCUMENTS 2466925 4/1981 France .
2002154 2/1979 United Kingdom .
2027252 2/1980 United Kingdom .
2050677 1/1981 United Kingdom .
2065416 6/1981 United Kingdom .

OTHER PUBLICATIONS

Masahiko Morizono et al., "Digital Video Recording-Some Experiments and Future Considerations" in SMPTE Journal, vol. 89, No. 9 (9/80), pp. 658-662.
Katsuya Yokoyama et al., "An Experimental Digital Videotape Recorder" in SMPTE Journal, vol. 89, No. 3 (3/80), pp. 173-180.
Ampex, "Labor-Experimentieranlage für Digitale Video-Magnetbandaufzeichnung," in Fernsehtechnik, vol. 51, No. 25 (12/79), pp. 72-74.

*Primary Examiner*—Robert L. Richardson
*Attorney, Agent, or Firm*—Watson, Cole, Grindle & Watson

[57] ABSTRACT

The present invention relates to digital television tape recording and more particularly to such recording using helical scan apparatus of the segmented type i.e. where one field of video is recorded by a plurality of rotations of the headwheel.

The invention also provides apparatus for recording or playing back a digital television signal comprising a helical scanning device including a drum which may be a rotatable headwheel provided with a plurality of recording/playback heads, guide means for wrapping a magnetic recording tape around a portion of the circumference of the drum, means for rotating the headwheel, and means for moving the tape around the surface of the drum whereby one field of a television video picture is recorded or played back by a plurality of rotations of the headwheel, characterized in that the recording/playback heads are disposed on the headwheel.

14 Claims, 5 Drawing Figures

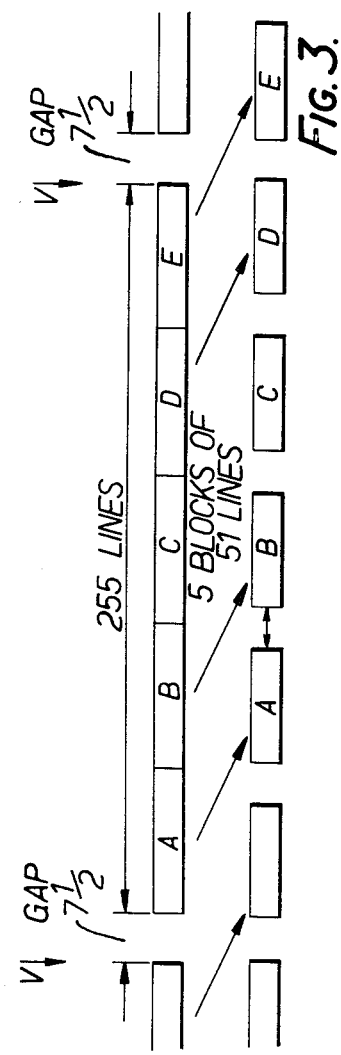
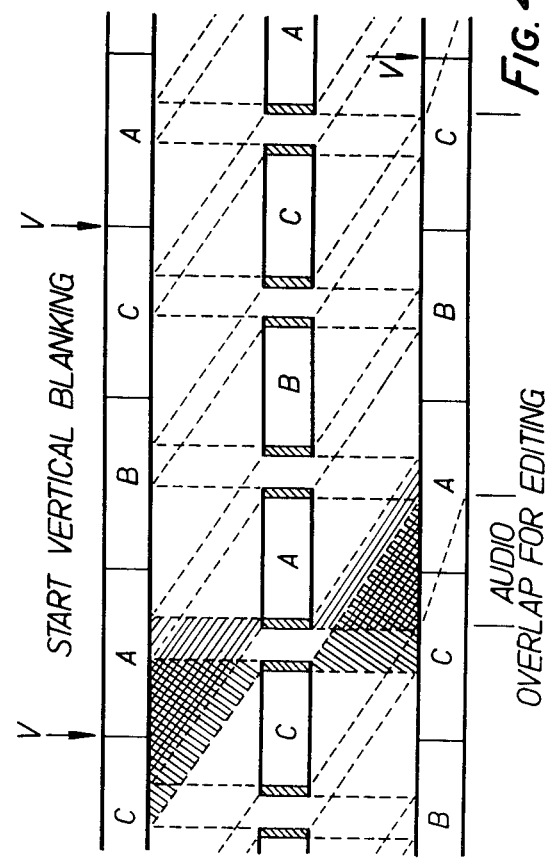

DIGITAL TELEVISION TAPE RECORDING

This application is a continuation of application Ser. No. 438,878 filed as PCT GB 82/00030 Feb. 5, 1982, published as WO 82/02810, Aug. 19, 1982, § 102(e) date Oct. 5, 1982.

The present invention relates to digital television tape recording, and more particularly to such recording using helical scan apparatus of the segmented type, i.e., where one field of video is recorded by a plurality of rotations of the headwheel.

In this specification the expression "plurality of rotations" means more than one rotation and includes fractional rotations in excess of one, e.g., one and one half rotations.

Digital television tape recording has already been the subject of considerable attention, but most work has been concentrated on the problems of high bit rates and packing densities and on error correction and concealment. While many of the problems have been largely solved, there is still a need for a format for digital television recording which will provide for improved error concealment or correction. Further, the requirements for recording the sound channel associated with the video has been largely ignored.

The present invention provides apparatus for recording or playing back a digital television signal comprising a helical scanning device including a drum which may be rotatable, a rotatable headwheel provided with a plurality of recording/playback heads, guide means for wrapping a magnetic recording tape around a portion of the circumference of the drum, means for rotating the headwheel, and means for moving the tape around the surface of the drum whereby one field of a television video picture is recorded or played back by a plurality of rotations of the headwheel characterised in that the recording/playback heads are disposed on the headwheel and the degree of wrap of the tape around the drum is such that for one complete revolution of the headwheel there is a period of time during which there is no head in operative contact with the tape, and storage means are provided for receiving information in the form of digital words to be recorded or played back for altering the timing of the information, whereby on recording all the information received is recorded on playback the information on the tape is recovered and returned to the timing relationship existing for the original information.

An advantage of this apparatus is that it records the video information on the tape in such a way as to leave gaps into which the audio information can be inserted. Further, at least one of the video heads can also be used for audio.

In order that the present invention be more readily understood, embodiments thereof will now be described by way of example with reference to the accompanying drawings, in which:

FIG. 3 shows a diagram similar to FIG. 2 for another proposal according to the invention;

FIG. 4 shows a diagram similar to FIG. 2 but for the audio signal associated with the line of video;

In the description which follows, it is assumed that segmental helical scan recording is well known and it will therefore not be described in detail. Further, the description is given in relation to recording one field of a television signal, it being understood that a television frame is made up to two interlaced fields.

Figure 1:
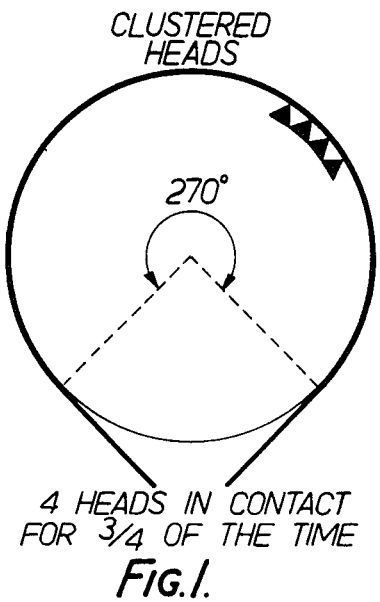
FIG. 1 shows diagrammatically a head arrangement and degree of tape wrap according to the present invention.

Referring now to FIG. 1, for the purpose of this consideration it has been assumed that the source data rate for video will be 216 Mbit/s. This corresponds to sampling the luminance at 13.5 MHz and each colour difference channel at 6.75 MHz. These particular frequencies are integral multiples of both 525 and 625 horizontal frequencies.

Further assumptions are that a 200:1 ratio between head and tape speed will be used under normal conditions, for example 1600 and 8 in/s respectively, and also that picture in shuttle is required at 30 times normal speed. The data rate recovered from tape under these conditions will be as if the 216 Mbit/s source data rate had been increased to 247. This is sufficiently high that at least three heads are required in operative contact with the tape.

FIG. 1 shows a cluster of four heads and a tape wrap angle of 270°. Thus with 4 heads in contact with the tape for ¾ of the time, this is equivalent to 3 heads in contact with the tape at all times which would be the more usual approach. The use of clustered heads means that buffer storage is needed due to there being no head in contact with the tape for ¼ of the time. The buffer storage is used to compress the digital information to be recorded into groups and afterwards stretch it out again. This will introduce delay in the video signal and this delay can be used to advantage for recording the audio signal as will be described later.

The number of heads in a cluster is dependent on the maximum data rate per track which can be tolerated having regard to tape consumption. Thus, in some circumstances only 3 heads may be needed as will be described later in relation to FIG. 3.

The angle of 270° that is shown for the clustered head approach gives the equivalent of three heads in continuous contact but the 270° can be changed. For example 240° gives the equivalent of 2⅔ heads whilst 300° would give the equivalent of 3⅓ heads in continuous contact. Such variations may be beneficial to optimise the format.

Two important advantages of the clustered head approach is that the failure of a channel perhaps due to a head clog, would produce a smaller level of impairment and that this impairment would be uniformly spread over the picture. This should be contrasted to a larger impairment which will appear only on bands of the picture for any equispaced approach; the larger impairment and in particular the banding would be much more apparent.

Assuming that four heads are used the average source bit-rate per track would be 54 Mbit/s. If a 270° tape wrap is used for video this has to be increased by a third giving 72 Mbit/s source bit-rate per track whilst the head is actually recording video.

This would require a head-to-tape speed equal to twice that of the SMPTE 'C' format. Obviously it would be impractical to double the drum diameter. It would be better to have two revolutions per field with the same drum diameter as used for the 'C' format but probably the best solution would be three revolutions per field and to decrease the drum diameter to about ⅔ of the 'C' format. This gives a higher pressure between tape and head and, allowing for 270° wrap, roughly halves the track length. Having three rotations per field does mean that track following servo has to have a greater range to yield satisfactory slow motion but this should not cause serious problems. However, the magnitude of this problem would increase with the number of rotations per field if the wrap angle is kept fixed.

Making the assumption of three rotations per field and that 270° rotation will be used for video, how should the buffer storage be arranged so that all the video information is bunched into the 270° bursts.

Because three rotations per field are assumed, it is necessary to divide up each field of video into three groups of lines. Also, it so happens that at 216 Megabits/second the information to be recorded by each one of the four heads during 17 active horizontal picture periods nicely fills 3 Random Access Memories (RAMs) each of 16k. Fortunately, 15 blocks of 17 lines gives an appropriate number of lines (255) to record on each field of the 525 lines standard; this would leave 7½ lines during field blanking unrecorded. It is also fortunate that 18 blocks of 17 lines would leave only 6½ lines recorded during field blanking on the 625 line standard. It is perhaps even more fortunate that both 15 and 16 are divisible by 3 for this embodiment.

Figure 2:
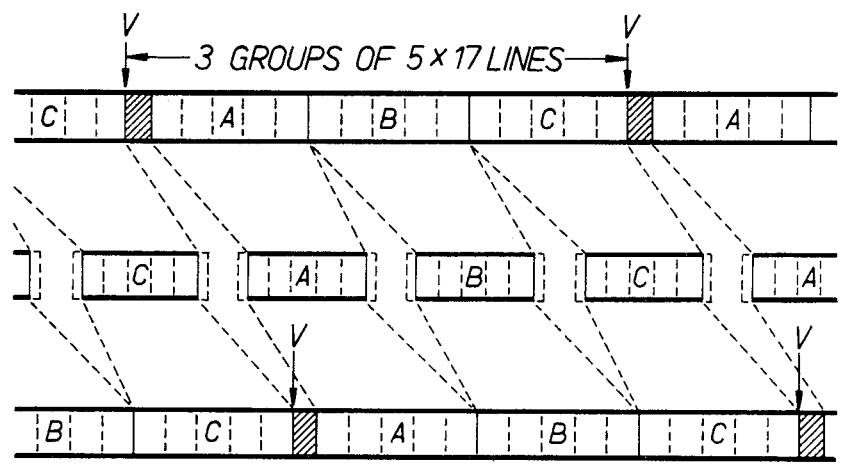
FIG. 2 shows a diagram representing how digital information relating to one line of video is recorded and played back according to the present invention.

At the top of FIG. 2, which describes how the video bunching is arranged for 525 lines, is shown the input signal to the recorder. At the centre appears the signal as it is to be recorded on tape; equally this line can also be considered to be the signal as recovered from the tape. The lowest line shows the final output signal as it leaves the recorder. The overall delay between the top and the bottom line is one head wheel rotation, that is a third of a field. From video considerations it could be less but when audio is taken into account this appears to be the optimum.

The arrows labelled V indicate the start of field blanking and just preceed the lost 7½ lines (6½ on 625) shown shaded. The video data in each successive block of 17 lines is shuffled as it is stored in the RAM's and is later read out, at a time determined by the headwheel rotation, at 1⅓ the input speed to bunch the data into a continuous block of 5 by 17 lines which is recorded on tape. When a block of 17 lines has been read out from a store the store may be re-used for later blocks of 17 lines.

An analogue but reverse process is used in replay to stretch the information and delay it appropriately. The data is unshuffled by using the same shuffling technique for addressing the stores on replay read as had been used for addressing the stores during the writing into the stores in the recording operation. The read and write operations from the stores at higher speed use ordinary sequential addressing.

FIG. 3 indicates an alternative way of recording the incoming digital information. At the top of FIG. 3 is shown the input signal to the recorder and the lower line indicates the signal as it is to be recorded on the tape or as it is recovered from the tape.

As before, it is assumed that the tape is wrapped around the drum for 270° but in this case only 3 heads are clustered together. The main difference between this arrangement and the previous one is that the size and number of the groups is altered. Previously, we had 3 groups of 85 lines, in this embodiment we have 5 groups of 51 lines to make up one field of 525 line system (6 groups would make up one field of a 625 line system). Irrespective of the standard, the groups would be identical; the only difference would be in the speed with which they are written into the buffer storage and read therefrom which would be in the ratio of 1000:1001 for the 525 and 625 line standards respectively.

The size of the groups is open to variation. Obviously for this purpose one has to consider the number of digital words in a line as well as the number of heads and the desired bit rate per head. With the sampling frequencies given above, there are 1440 8-bit words per line thus if 51 lines are used there are a total of 73,440 words. We have determined that the minimum number of heads in contact with the tape at any one time is two but that three or four heads is more likely to be the number in practice. Further, it is possible to group the heads in pairs or threes diametrically opposite to each other and use a tape wrap of 180°. If pairs of heads are used, there will be ten tracks recorded per field of a 525 line picture frame; this becomes 15 tracks if three heads per group are used. It would be possible to decrease the group size for the paired head approach to 25½ lines in which case there will be 20 tracks per field of a 525 line frame. It is preferred that the number of tracks recorded be in the range of 10 to 20 tracks. This indicates that the size of a group be 17, 25½, 51 or 85.

As mentioned before, an advantage of the system described above is that the audio signal associated with the video can be recorded in a convenient manner. Referred to FIG. 2, it will be noted that there are dotted extensions at both ends of each group; this is where the audio will be fitted in. On tape there will be an audio preamble followed by the first audio digital data, a video preamble followed by 85 lines of video data, broken up by framing information, and lastly a further audio preamble followed by the second audio digital data. Individual preambles are used for audio and video so that separate editing is possible. For the FIG. 3 arrangement, the video preamble will be followed by 51 lines of video data.

FIG. 4 is essentially of the same form as the FIG. 2 but considers the audio rather than the video signals. The audio data that represents one audio signal during a time equal to one third of a field is bunched together and is added on to the end of the video data, on one of the heads, with an intervening preamble; this bunching is illustrated by the left hand shaded area between the top and centre lines, the one shaded by lines from bottom left to top right. The audio data from the same source again during a time equal to a third of a field and substantially overlapping that already considered is bunched together and preceeds the video data not on the same head but a different one. A different one is used so that the failure of a single head will not lose that audio channel, it will only cause less satisfactory error concealment and editing. During each sweep one head allocation is used for the sound channels for the first blocks of audio and a differing head allocation used for the second audio blocks.

On replay the bunched data is stretched out as shown by the similarly shade areas and is delayed by the same amount as the video.

For a 270° video wrap the audio overlap is marginally longer than a quarter of a field so it is about 4.2 milliseconds on 525 lines. This is greater than the minimum of 3.3 milliseconds considered necessary for the duration of the cross-fade to achieve good click-free audio editing. This length of overlap occurs three times per field although for simiplicity it is only shown once per field in this figure. For the FIG. 3 arrangement, this length of overlap occurs five times per field.

A further advantage of the system is that error concealment is facilitated. This is achieved by "shuffling" the data in the buffer stores prior to recording and conducting an opposite process on replay.

It is not intended to give a precise error concealment since any one of a number of schemes could be used for example the one disclosed in our U.S. Pat. No. 4,277,807. However, some general considerations will be discussed in relation to the FIG. 3 embodiment.

Drop-outs can be so long that pure error correction schemes are not practicable for the bit-rates under consideration. Error concealment has to be used in this case; indeed it can be argued that since the number of unconcealed errors using pure concealment is inherently lower than the number obtained using a mixed error correction/concealment strategy, it may be better to rely purely on error concealment. This subject however is not germaine to the topic of formats except for one conclusion which is that error concealment must be used either purely or in conjunction with error correction.

Since drop-outs may last hundreds and even thousands of words, it is necessary that adjacent words of the input picture should be well separated on the tape so that words which may be used for concealment of a word in error are unlikely to be affected by the same drop-out. This is an essential requirement but there is also considerable benefit obtained by spreading the effect of a drop-out so that a large area is affected to a small extent rather than a small area being affected to a much greater extent. The extent to which this "shuffling" of words be taken is debatable but it seems logical to extend it sufficiently far that a longitudinal scratch on the tape will cause a uniform distribution of concealment or correction over the complete picture. This will be achieved by shuffling the words over the whole of a 51 line group. Such shuffling requires a pair of buffer stores each with a capacity of 51 lines and since writing and reading cannot overlap and must alternate in this case, there will be a delay of 51 lines.

Information during 51 lines will be written into the shuffling store and will be read from it during approximately 39 lines of a standard 525 line signal and recorded on tape. Using two shuffling stores there will be a permissible float of 12 lines which arises from the difference in time for writing and reading. After allowing for retiming the signal to make equispaced blocks for recording on tape there will remain some 4 lines of float for other purposes, e.g., during synchronising operations.

During each line of the television signal a total of 1440 words, each of eight bit, define the picture. Each of the three heads will therefore need to handle 480 words per line.

It would be convenient to organise the data into groups of 256 words. During picture in shuttle it will be necessary to identify which of the 5 (6) groups in a field is being replayed by each head and also which of the three heads recorded that particular track. This gives a maximum of 18 combinations for 625 lines. This will require 5 bits for identification and it will be convenient to arrange information to occur once in every group of 256 words; if one eight bit word be allocated for this purpose there will be 255 words usable for recording video in each group. There will also be three bits of this identifier word spare for other purposes.

It so happens that 255 and 480 are both divisible by 15 so each word group will contain precisely 17/32 of the words needing to be recorded by one head in a line. During 17 lines there will be 32 words groups or 96 word groups in a group of 51 lines for each head.

During a 15 line block for each head there will be 96×256 words which is equal to three times 8192. This is extremely fortunate since 8192 is precisely 2 raised to the power 13 and a so-called 64k RAM organised as an 8-bit by 8k would just be completely filled by precisely one third of the words recorded by a head in a block of 51 lines This fortunate coincidence makes the choice 51 lines per block and 3 heads in contact with the tape very advantageous.

In order to obtain optimum performance in the presence of drop-outs or under shuttle conditions each word group should contain words which are uniformly distributed over the 51 line/groups of the picture. If this be done and if synchronising information precedes each word group it appears likely that a good picture in shuttle could be provided up to about twenty five times normal speed but beyond this speed the quality of the picture must inevitably start to degrade; this seems to be acceptable.

For 1440 words per line unless more than six heads are in contact with the tape it is inevitable that regular distribution of the words between heads will result in vertically adjacent words being recorded by the same head. This is undesirable since if a head becomes clogged, some of the words useful for concealing the missing words will also be missing. In this case the problem arises because 1440 is a multiple of 3, the number of heads. The problem can be overcome by causing an additional step in the normal regular distribution of words between head channels; this additional step must occur at least once per line and the range up to not more than twice per line is satisfactory. Since the word groups last 17/32 of a line this additional step can be synchronised with the start of each word group. Information regarding which of the three possible phases starts a word group will also need to be included in the word group identifier and could use two of the three previously unused bits in this word.

The stores used for shuffling in record and the deshuffling in replay are identical in principle and indeed the same store can be used for both purposes. On the tape side of the store the read or the write cycle time of the RAMs is nominally 300 ns; during the other phase of store operation the cycle time would be 333 ns. This does not seem to be unreasonably fast.

These stores provide a time base correcting window for some four lines after allowing for the systematic errors inherent in the basic system. This window is also available in record and could be used by way of example to allow for timing perturbations during synchronising operations or to correct for rapid angular accelerations of the body of the recorder during operation.

At present 64k RAMs are not available organised as 8 by 8k; 8 by 2k are available and it seems reasonable to expect that 8 by 8k will become available in the not too distant future.

All three heads for this track configuration will be mounted on a single electro-mechanical transducer which is an obvious advantage provided the additional mass of the heads does not cause a significant reduction of the frequency of mechanical resonance.

The time available to fly back during slow motion in 833 us but this has to be decreased by the amount of time necessary for synchronisation and that required for audio. This may prove to be marginally too short but a reduction from 270° to 260° would increase it to 926 us.

By advancing the confidence replay heads by six tracks during editing and by using separate shuffling stores for record and replay it would be possible to realise fades and wipes rather than the cuts imposed by conventional analogue recorders if only one replay machine is available.

Figure 5:
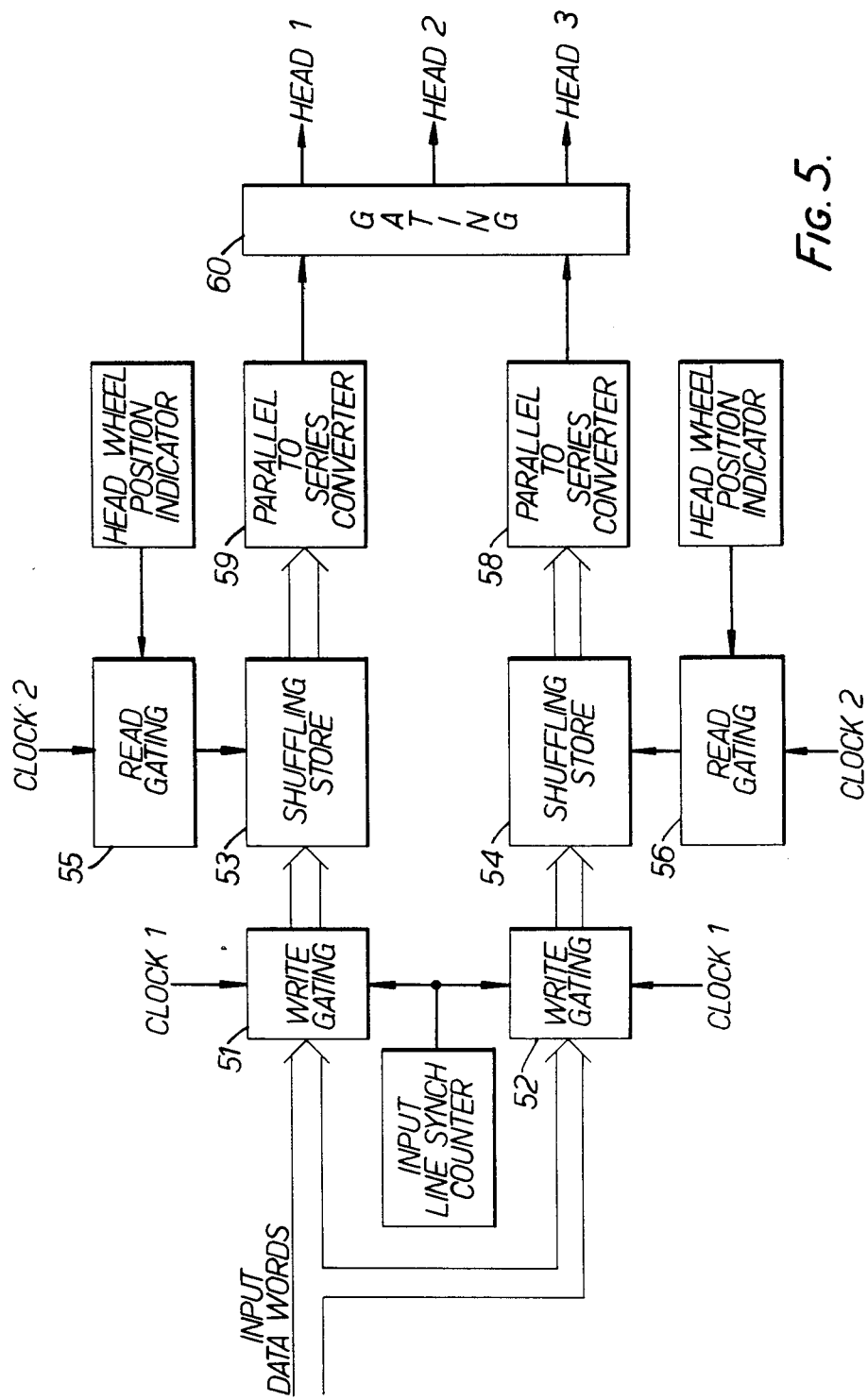
FIG. 5 shows a block diagram of apparatus for recording a video signal according to the present invention.

Advantages of the Proposed 270° 3-Head Configuration:

the same three heads are all used for every part of the picture, head banding type of effects are therefore most unlikely.

the extent of shuffling is sufficient for a good picture in shuttle at all speeds up to a reasonable maximum; this shuffling extent also provides optimum immunity to longitudinal tape scratches.

there is no sharing of any track between one field and the next; this will ease the problem if non-standard television signals are recorded. The philosophy of using 5 self-contained "groups" per 525 line field may make the recorder more adaptable for non-television applications.

time-base correction window exceeding four lines on both record and playback.

small number of heads and associated hardware. However, there are two potential problems:

high lateral accelerations of heads during flyback of the track following servo in slow motion. This problem could be avoided by using a field store.

high rotational speed of head wheel, 300 revs/second. For completeness, FIG. 5 shows a block diagram for the record side of recording and reproducing apparatus utilizing the format shown in FIG. 3. The reproducing block diagram is not given because it is felt that the description given in our U.S. Pat. No. 4,277,807 is sufficient for one skilled in the art to modify it to reproduce the signal. It is to be noted however, that the error signal storage in this patent is not required for the present case.

Turning now to FIG. 5, incoming video data words to be recorded are in the form of 8-bit words and are fed via write gating circuits 51, 52 to shuffling stores 53, 54 each of a capacity of fifty one lines. The gating circuits 51, 52 are supplied with clock pulses at the input data rate and every 51 lines are of the gating circuits is opened in response to a signal derived from the input line synchs. Preferably, the data is written into the stores in "shuffled" form, i.e., adjacent words are not loaded sequentially into adjacent memory locations and read out in a sequential manner.

The reading out of data from the stores 53, 54 is controlled by read gating circuits 55, 56 each of which is supplied with clock pulses at a rate higher than the input data rate whereby the stores are emptied quicker than they are filled and preferably at a rate equivalent to 39 lines a 525 lines standard. Additionally, each of the read gating circuits is controlled by a signal indicative of the headwheel position and derived either directly from the headwheel or from its drive circuitry (now shown).

The outputs of the shuffling stores are fed to parallel to series converter circuits 58, 59 where the parallel data words are converted into a stream of serial bits and thence via a further gating circuit 60 to the three recording heads.

I claim:

1. Apparatus for recording or playing back a digital television signal comprising a helical scanning device including a drum which may be rotatable, a rotatable headwheel provided with a plurality of recording/playback heads, guide means for wrapping a magnetic recording tape around a portion of the circumference of the drum, means for rotating the headwheel, and means for moving the tape around the surface of the drum whereby one field of a television video picture is recorded or played back by a plurality of rotations of the headwheel, characterised in that the recording/playback heads are disposed on the headwheel and the degree of wrap of the tape around the drum is such that for one complete revolution of the headwheel there is a period of time during which there is no head in operative contact with the tape, and storage means are provided for receiving information in the form of digital words to be recorded or played back for altering the timing of the information whereby on recording all the information received is recorded and on playback the information on the tape is recovered and returned to the timing relationship existing for the original information.

2. Apparatus according to claim 1, wherein all the heads are clustered together over one segment of the headwheel and the degree of wrap is from 180° to 330°.

3. Apparatus according to claim 2, wherein there are at least three heads and the degree of wrap is between 240° and 300°.

4. Apparatus according to claim 1, wherein there are diametrically opposed heads or head groups, and the rotation of the heads in which they are active for video is less than 180°.

5. Apparatus according to claim 1, wherein storage means comprise a plurality of stores for storing the digital words in the form of blocks of words, each block corresponding to a predetermined number of lines of a video signal and the stores being written into at one speed and read from at a second speed different to the first.

6. Apparatus according to claim 5, wherein each store is capable of storing information relating to 51 lines of a television video signal or a sub-multiple thereof.

7. Apparatus according to claim 5, wherein, for recording means are provided responsive to timing signals in the digital information to be recorded for controlling the writing in of digital information into the desired one of the stores, and means indicative of the position of the headwheel are provided for controlling the reading of digital information from a desired one of the stores.

8. Apparatus according to claim 1, wherein means are provided for supplying signals indicative of the audio information associated with the video to at least one of the heads for recording on the tape in the gaps between adjacent blocks of video information.

9. Apparatus according to claim 8, wherein said means is arranged to time compress the audio information.

10. Apparatus for recording or playing back a digital television signal comprising a helical scanning device including a drum which may be rotatable, a rotatable headwheel provided with a plurality of recording/playback heads, guide means for wrapping a magnetic recording tape around a portion of the circumference of the drum, means for rotating the headwheel, and means for moving the tape around the surface of the drum whereby one field of a television video picture is recorded or played back by a plurality of rotations of the headwheel, characterised in that the recording/playback heads are disposed on the headwheel diametrically opposite each other, storage means are provided for receiving information in the form of digital words representing video signals to be recorded or played back for altering the timing of the information whereby, for one complete revolution of the headwheel there is a period of time during which there is no head recording or playing back said digital words, thereby to record the video signals in blocks on the tape with gaps therebetween, and means are provided for supplying signals indicative of the audio information associated with the video signals to at least one of the heads for recording audio information on the tape in gaps between adjacent blocks of video information.

11. Apparatus according to claim 10, wherein there are diametrically opposed head groups, and the rotation of the heads in which they are active for video is less than 180°.

12. Apparatus according to claim 10, wherein said storage means comprise a plurality of stores for storing the digital words in the form of blocks of words, each block corresponding to a predetermined number of lines of a video signal and the stores being written into at one speed and read from at a second speed different to the first.

13. Apparatus according to claim 12, wherein, for recording means are provided responsive to timing signals in the digital information to be recorded for controlling the writing in of digital information into the desired one of the stores, and means indicative of the position of the headwheel are provided for controlling the reading of digital information from a desired one of the stores.

14. Apparatus according to claim 13, wherein said means is arranged to time compress the audio information.

* * * * *